Oct. 21, 1941. J. F. HENNESSY 2,259,639
OVEN FOR GAS RANGES
Filed Feb. 6, 1939 2 Sheets—Sheet 2

Inventor:
John F. Hennessy
By McCanna, Wintercorn & Morsbach
Attys.

Patented Oct. 21, 1941

2,259,639

UNITED STATES PATENT OFFICE 2,259,639

OVEN FOR GAS RANGES

John F. Hennessy, Rockford, Ill., assignor to Geo. D. Roper Corporation, Rockford, Ill., a corporation of Illinois Application February 6, 1939, Serial No. 254,757

6 Claims. (Cl. 126—39)

This invention relates to gas ranges and is particularly concerned with an improved oven construction.

The principal object of my invention is to provide an oven so designed as to secure quicker preheating, more uniform heat distribution and better all-around efficiency in operation.

Another object is to provide an oven so designed and constructed that the common objection of a hot bottom is avoided.

The salient feature of the present oven is the transmission of heat to the oven principally by convection, direct heat of radiation from the oven burner being reflected downwardly away from the oven bottom and special provision being made in the oven walls to set up and induce turbulence within the oven, so as to quickly displace cold air for quick preheating of the oven and by the same method secure good circulation in the oven throughout its performance for uniform heat distribution and better efficiency in maintaining a given temperature, and to secure generally improved performance.

The invention is illustrated in the accompanying drawings, in which—

The same reference numerals are applied to corresponding parts in these two views.

Figure 1:
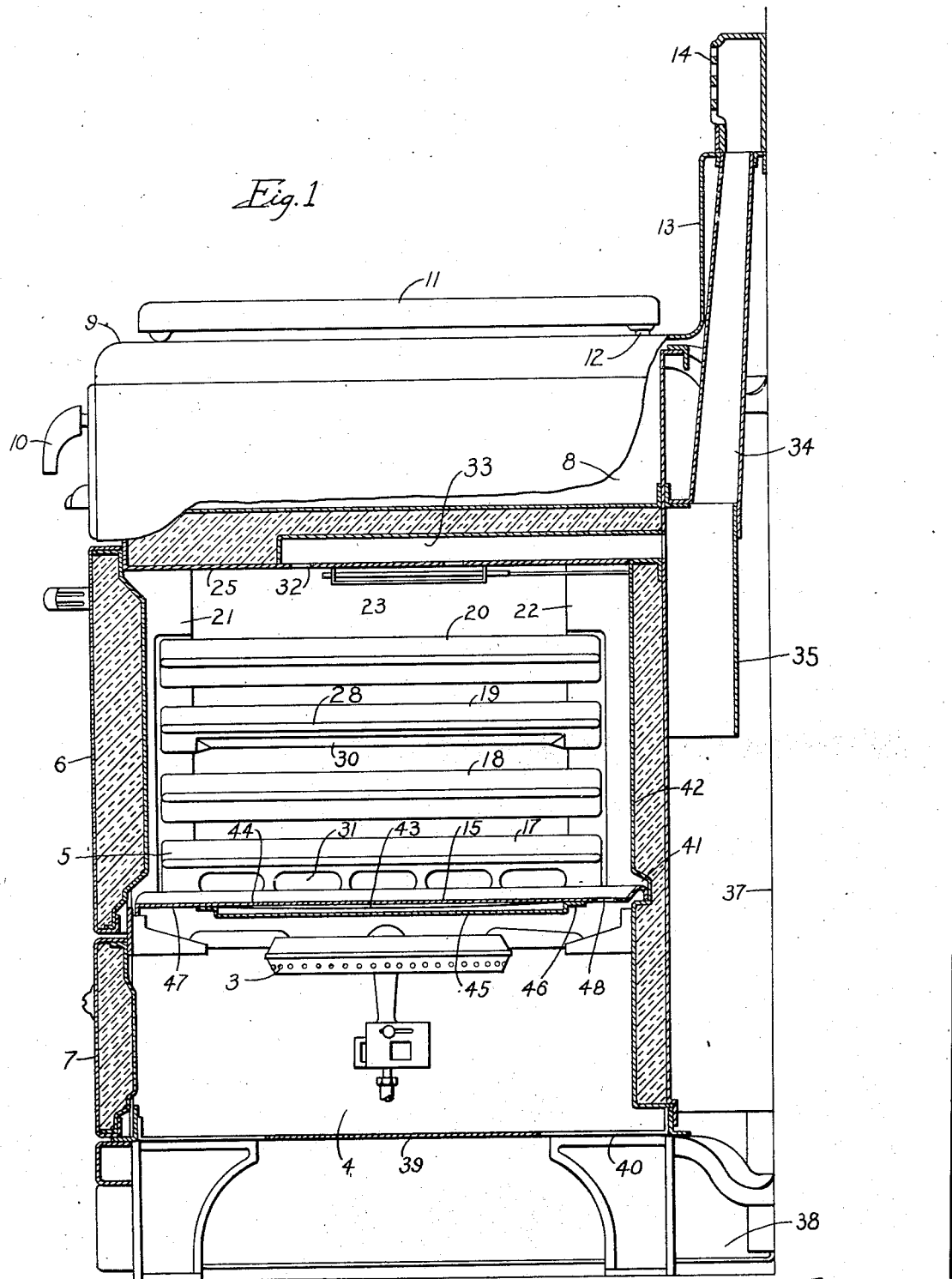
Fig. 1 is a longitudinal vertical section through a gas range showing the oven construction of my invention.

The range illustrated is of the low oven type in which the oven burner 3 is in a small compartment 4 beneath the oven 5 and is used only for heating the oven, but it will be understood that the invention is also applicable to other styles of gas ranges and may be used in double oven types with equal facility wherein the burner in addition to heating a baking oven is also used for broiling. While the burner 3 is of the design shown in my application Serial No. 211,763, filed June 4, 1938, it will also be understood that any other design of oven burner or combination oven and broiler burner suitable for the purpose may be substituted. In the present range, 6 is the hinged oven door for the oven 5, and 7 is a closure for the burner compartment 4 which may or may not be hinged, but is preferably removably mounted in the open front of said compartment, so that access may be had to the burner when desired. 8 is the burner box compartment above the oven 5 in which burners for the cooking top 9 are disposed and controlled by cocks operated by knobs 10 on the front of the stove. A lift cover 11 is hinged at 12 to swing from the lowered position covering the cooking top to a vertical position therebehind in front of the back rail 13 and flue deflector 14.

Figure 2:
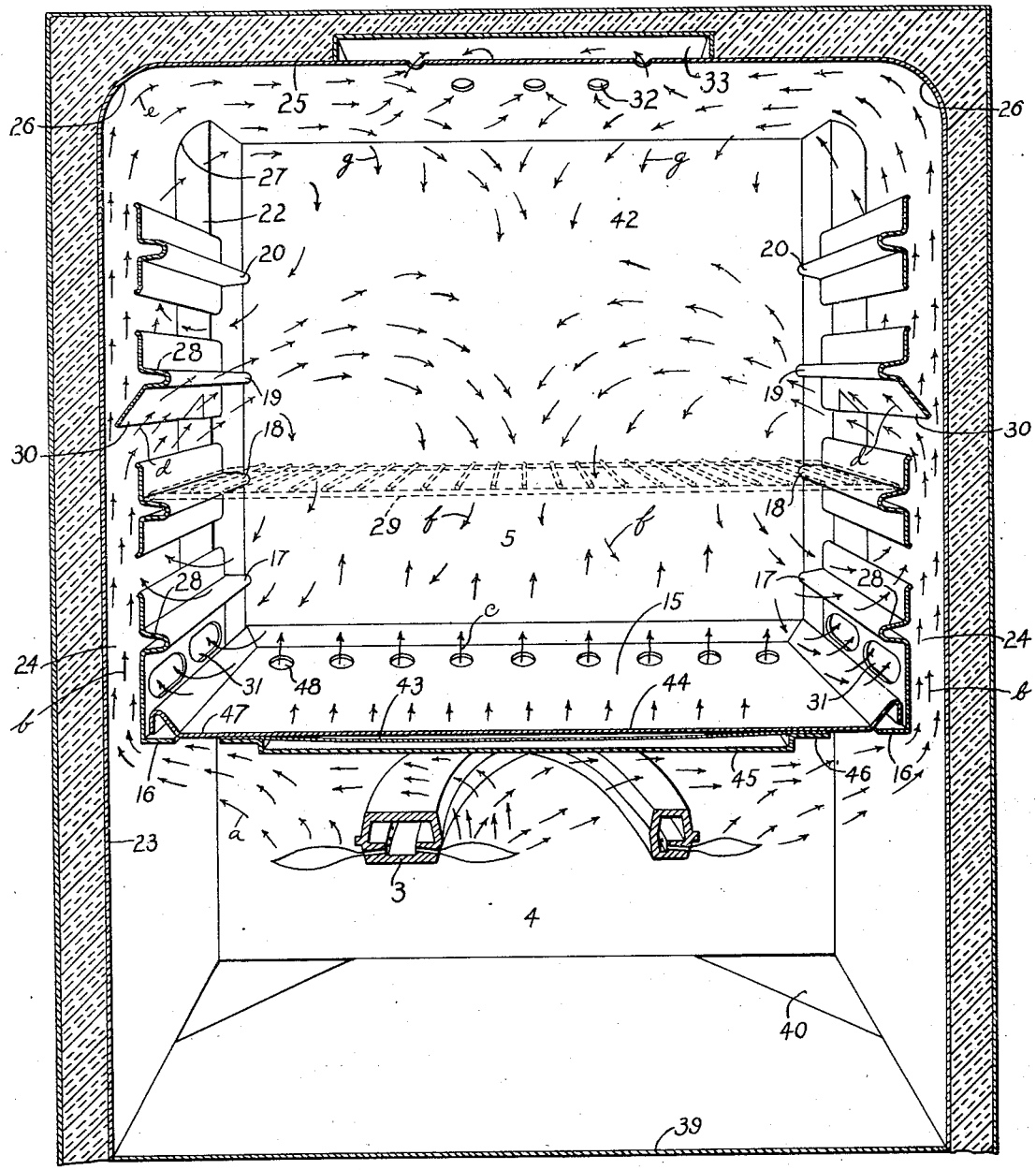
Fig. 2 is a more or less diagrammatic cross-sectional view through the oven, showing the parts in perspective to enable better illustration with arrows the mode of operation.

The oven 5 of my invention has a bottom 15 removably supported on inwardly projecting ledges 16 provided on the bottom edges of the lower opposed rack guides 17. At 18, 19, and 20 are indicated other horizontal rack guides in vertically spaced relation above and parallel to the rack guides 17. All of these rack guides are of sheet metal construction and are carried on front and rear sheet metal pilasters 21 and 22, suitably supported in the oven so that the rack guides are in laterally spaced relation to the sheet metal inner side walls 23 of the oven. In that way, vertical passages 24 are provided behind the rack guides on opposite sides of the oven for the circulation of hot products of combustion from the oven burner 3. The top wall 25 is shown in Fig. 2 as integral with the side walls 23, but, of course, may be made in a separate piece. In any event, it will be noticed that the top corners 26 are curved and the upper ends 27 of the pilasters 21—22 are correspondingly curved to fit neatly in the top corners in the oven. This inward curvature from the upper ends of the side walls toward the top wall is important, as will hereinafter appear, in the deflection of the upwardly flowing products from the passages 24 inwardly into the oven space. Each of the rack guides is formed to provide intermediate its upper and lower edges an inwardly projecting hollow longitudinal rib 28, the tops of which serve as ledges on which one or more oven racks, like that indicated in dotted lines at 29 in Fig. 2, may be slidably supported. The second highest rack guides 19 on both sides of the oven have the lower marginal portions bent outwardly at an acute angle to the vertical, so as to reach about half way across the passages 24 toward the side walls 23 to provide deflectors 30 in a transverse horizontal plane approximately through the middle of the oven. These deflectors, as will later appear, serve to deflect a substantial portion of the products flowing upwardly in the passages 24 inwardly into the oven space. The lowermost rack guides 17 are wider than the other guides, so as to provide the ledges 16 appreciably spaced below the ribs 28, and each of these rack guides has a series of longitudinal spaced holes 31 provided therein below the ribs 28 in a plane above the oven bottom 15 resting on the ledges 16. These holes permit flow of products from the oven space back into the passages 24. There are holes 32 in the top wall 25 at the approximate center of the oven through which products can be discharged into a sheet metal flue 33 so as to be conducted from the oven. A connecting flue 34 is vertically disposed behind the range to carry the products to the flue deflector 14 from which they are discharged into the kitchen. The flue extension 35 below the connecting flue 34 establishes communication between the flues 33 and 34 and insures a good stack effect so that the products will rise properly in the flue 34. 37 indicates the wall behind the range in relation to which the range is kept properly spaced by the jacket extensions 38 on the opposite sides of the range. The bottom 39 of the burner compartment 4 has holes 40 provided therein at the corners of said compartment to furnish air to support combustion.

The oven bottom 15, which it will be noticed in Fig. 1 has its rear end projecting into a recess 41 provided therefor in the inner back wall 42 of the oven, is specially constructed to prevent, or at least greatly retard, the transmission of heat from the burner to the oven bottom by radiation. I provide a sheet of aluminum foil 43 between the upper and lower walls 44 and 45 of the hollow oven bottom with the bright side down so as to reflect radiant heat from the burner downwardly away from the wall 44 forming the bottom of the oven proper. This foil interferes only with the heat of radiation and does not disturb the convection and conduction heat factors and avoids the common objection of a hot bottom. The foil is simply spread across the bottom of the wall 44 and clamped in place by the marginal outwardly projecting flange 46 on the wall 45 in the riveting or other fastening of the latter to the wall 44. Aluminum foil is obtainable bright on both sides, but inasmuch as it means added cost in its manufacture and because it is only important that the bottom side be bright, I have specified the use of such foil here. Obviously, in the case of a double oven where the burner is used for broiling in addition to heating the oven, the reflection of radiant heat downwardly will increase broiling efficiency. The flanges 46 on the wall 45 leave the marginal portion 47 of the wall 44 uncovered along the opposite sides and ends of the oven bottom 15, and there is a series of laterally spaced holes 48 provided along the back of the oven in this marginal portion. These holes permit direct flow of products from the burner upwardly into the oven at the rear end thereof.

In operation, as soon as the oven burner is lighted, hot products of combustion flow, as indicated by the arrows a, upwardly and outwardly in all directions from the burner under the oven bottom 15, the greater portion flowing upwardly, as indicated at b, in the passages 24, and a certain amount flowing into the oven through the holes 48, as indicated at c. A large percentage of the hot products rising in the passages 24 is deflected inwardly into the oven space by the deflectors 30, as indicated at d, and the balance flows upwardly and is eventually deflected inwardly by the curved top corner portions 26 of the oven side walls 23, as indicated at e. The resulting turbulence in the oven is indicated by the arrows at f and g. The incoming hot products at d displace the cold air, some of which finds its way out through the spaces between the rack guides 17 and 18 and the balance through the holes 31, as indicated by the arrows, the cold air mixing in the passages 24 with the hot products rising therethrough. In like manner, the incoming hot products at e displace cold air from the upper portion of the oven and it finds its way out through the spaces between the rack guides 19 and 20 and mixes with the hot products rising through the passages 24. It used to take about twenty minutes to preheat an oven for baking or other oven operations, but I have found with the present construction that the preheating time is reduced to ten to twelve minutes. This is considered to be directly attributable to the good circulation secured with the present construction. The good circulation, I have also found, makes for better efficiency in maintaining a given oven temperature besides giving uniform heat distribution. Uniformity of heat distribution in so far as the oven bottom 15 is concerned is, however, attributable almost entirely to the use of the radiant heat deflecting aluminum foil 43. Direct radiation from the oven burner is cut off by the aluminum foil and cannot therefore interfere with uniform heating of the oven. The oven is heated almost exclusively by convection, as indicated by the hot air currents shown in Fig. 2. The currents shown there are what are set up during the early stages of preheating, and, of course, there will be some changes in these currents as the temperature of the oven rises and eventually reaches an equilibrium. While I have obtained even heat distribution by directing the convection currents as herein disclosed and deflecting the radiant heat so as to protect the bottom of the oven and keep it from getting too hot, I would also call attention to the fact that the provision of the openings 48 in the rear end of the oven bottom 15 is an aid in that direction. The explanation of this is that there is a certain amount of seepage of heat from the front end of the oven around the oven door 6, principally past the top thereof, and if it were not for the fact that hot products are admitted directly to the bottom of the oven at the rear to offset such seepage, there would be a tendency for the oven temperature to be lower at the rear end. The fact, too, that products are discharged from the oven at the center of the top also has a tendency toward maintaining a uniform oven temperature.

It is believed the foregoing description conveys a good understanding of the objects and advantages of my invention. The appended claims have been drawn with a view to covering all legitimate modifications and adaptations.

I claim:

1. In an oven for a gas range comprising outer oven walls forming an enclosure having a lower inlet for air and an upper outlet for exhausting products of combustion, and a burner in said enclosure, an inner oven structure comprising in combination with an oven bottom disposed horizontally over the burner dividing the enclosure into an upper oven compartment and a lower burner compartment, combined rack and oven bottom supporting means and oven heat circulating means comprising upright supports in opposite sides of the oven compartment, a plurality of horizontal rack guides mounted on said supports in vertically spaced relation to one another and laterally spaced from the adjacent side walls of the enclosure whereby to provide opposed vertical passages between the rack guides and said side walls for circulation of products of combustion upwardly from the burner compartment and openings between the rack guides for circulation of products between the passages and the oven compartment in both directions, said rack guides being adapted to support oven racks through which the products are free to circulate, upwardly and inwardly inclined deflectors at the upper ends of the vertical passages for directing the upwardly flowing products from the passages over the uppermost rack guides and into the oven compartment with a swirling motion, the lowermost rack guides having recirculation openings provided therein above the oven bottom establishing communication between the vertical passages and the oven compartment for return of a certain portion of the products into said passages before ultimate discharge from the oven through the upper outlet, and supporting ledges on the lowermost rack guides for supporting the oven bottom.

2. In an oven for a gas range comprising outer oven walls forming an enclosure having a lower inlet for air and an upper outlet for exhausting products of combustion, and a burner in said enclosure, an inner oven structure comprising in combination with an oven bottom disposed horizontally over the burner dividing the enclosure into an upper oven compartment and a lower burner compartment, combined rack and oven bottom supporting means and oven heat circulating means comprising upright supports in opposite sides of the oven compartment, a plurality of horizontal rack guides mounted on said supports in vertically spaced relation to one another and laterally spaced from the adjacent side walls of the enclosure whereby to provide opposed vertical passages between the rack guides and said side walls for circulation of products of combustion upwardly from the burner compartment and openings between the rack guides for circulation of products between the passages and the oven compartment in both directions, said rack guides being adapted to support oven racks through which the products are free to circulate, outwardly and downwardly projecting deflectors on certain of said rack guides for directing upwardly flowing products from the vertical passages into the oven compartment, inwardly and upwardly inclined deflectors at the upper ends of the vertical passages for directing upwardly flowing products from the passages over the uppermost rack guides into the oven compartment, the products being directed by said first and last mentioned deflectors into a swirling motion within the oven compartment, the lowermost rack guides having recirculation openings provided therein above the oven bottom establishing communication between the vertical passages and the oven compartment for return of a certain portion of the swirling products from the oven compartment to said passages before ultimate discharge through the upper outlet, and supporting ledges on the lowermost rack guides for supporting the oven bottom.

3. In an oven for a gas range comprising outer oven walls forming an enclosure having a lower inlet for air and an upper outlet for exhausting products of combustion, and a burner in said enclosure, an inner oven structure comprising in combination with an oven bottom disposed horizontally over the burner dividing the enclosure into an upper oven compartment and a lower burner compartment, combined rack and oven bottom supporting means and oven heat circulating means comprising upright supports in opposite sides of the oven compartment, a plurality of horizontal rack guides mounted on said supports in vertically spaced relation to one another and laterally spaced from the adjacent side walls of the enclosure whereby to provide opposed vertical passages between the rack guides and said side walls for circulation of products of combustion upwardly from the burner compartment, and openings between the rack guides for circulation of products between the passages and the oven compartment in both directions, said rack guides being adapted to support oven racks through which the products are free to circulate, outwardly and downwardly projecting deflectors on certain of said rack guides for directing upwardly flowing products from the vertical passages into the oven compartments, the lowermost rack guides having recirculation openings provided therein above the oven bottom thus establishing communication between the vertical passages and the oven compartment, and supporting ledges on the lowermost rack guides for supporting the oven bottom.

4. In an oven for a gas range comprising outer oven walls forming an enclosure having a lower inlet for air and an upper outlet for exhausting products of combustion, and a burner in said enclosure, an inner oven structure comprising in combination with an oven bottom disposed horizontally over the burner dividing the enclosure into an upper oven compartment and a lower burner compartment, combined rack and oven bottom supporting means and oven heat circulating means comprising upright supports in opposite sides of the oven compartment, a plurality of horizontal rack guides mounted on said supports in vertically spaced relation to one another and laterally spaced from the adjacent side walls of the enclosure whereby to provide opposed vertical passages between the rack guides and said side walls for circulation of products of combustion upwardly from the burner compartment, and openings between the rack guides for circulation of products between the passages and the oven compartment in both directions, said rack guides being adapted to support oven racks through which the products are free to circulate, outwardly and downwardly projecting deflectors on certain of said rack guides for directing upwardly flowing products from the vertical passages into the oven compartment, inwardly and upwardly inclined deflectors at the upper ends of the vertical passages for directing upwardly flowing products from the passages over the uppermost rack guides into the oven compartment, and supporting ledges on the lowermost rack guides for supporting the oven bottom.

5. In an oven for a gas range comprising outer oven walls forming an enclosure having a lower inlet for air and an upper outlet for exhausting products of combustion, and a burner in said enclosure, an inner oven structure comprising in combination with an oven bottom disposed horizontally over the burner dividing the enclosure into an upper oven compartment and a lower burner compartment, combined rack and oven bottom supporting means and oven heat circulating means comprising upright supports in opposite sides of the oven compartment, a plurality of horizontal rack guides mounted on said supports in vertically spaced relation to one another and laterally spaced from the adjacent side walls of the enclosure whereby to provide opposed vertical passages between the rack guides and said side walls for circulation of products of combustion upwardly from the burner compartment, and openings between the rack guides for circulation of products between the passages and the oven compartment in both directions, said rack guides being adapted to support oven racks through which the products are free to circulate, and outwardly and downwardly projecting deflectors on certain of said rack guides for directing upwardly flowing products from the vertical passages into the oven compartment.

6. In an oven for a gas range comprising outer oven walls forming an enclosure having a lower inlet for air and an upper outlet for exhausting products of combustion, and a burner in said enclosure, an inner oven structure comprising in combination with an oven bottom disposed horizontally over the burner dividing the enclosure into an upper oven compartment and a lower burner compartment, combined rack and oven bottom supporting means and oven heat circulating means comprising upright supports in opposite sides of the oven compartment, a plurality of horizontal rack guides mounted on said supports in vertically spaced relation to one another and laterally spaced from the adjacent side walls of the enclosure whereby to provide opposed vertical passages between the rack guides and said side walls for circulation of products of combustion upwardly from the burner compartment, and openings between the rack guides for circulation of products between the passages and the oven compartment in both directions, said rack guides being adapted to support oven racks through which the products are free to circulate, outwardly and downwardly projecting deflectors on certain of said rack guides for directing upwardly flowing products from the vertical passages into the oven compartment, inwardly and upwardly inclined deflectors at the upper ends of the vertical passages for directing upwardly flowing products from the passages over the uppermost rack guides into the oven compartment, the lowermost rack guides having recirculation openings provided therein above the oven bottom thus establishing communication between the vertical passages and the oven compartment, and supporting ledges on the lowermost rack guides for supporting the oven bottom.

JOHN F. HENNESSY.